(12) United States Patent
Chang et al.

(10) Patent No.: US 11,640,061 B2
(45) Date of Patent: *May 2, 2023

(54) NEAR EYE DISPLAY SYSTEM AND OPERATION METHOD THEREOF

(71) Applicant: Wistron Corporation, New Taipei (TW)

(72) Inventors: Yao-Tsung Chang, New Taipei (TW); Chen-Yi Liang, New Taipei (TW)

(73) Assignee: Wistron Corporation, New Taipei (TW)

( * ) Notice: Subject to any disclaimer, the term of this patent is extended or adjusted under 35 U.S.C. 154(b) by 34 days.

This patent is subject to a terminal disclaimer.

(21) Appl. No.: 17/117,113

(22) Filed: Dec. 10, 2020

(65) Prior Publication Data
US 2021/0096381 A1    Apr. 1, 2021

Related U.S. Application Data

(63) Continuation of application No. 15/826,688, filed on Nov. 30, 2017, now Pat. No. 10,955,667.

(30) Foreign Application Priority Data

Aug. 1, 2017  (TW) .................................. 106125974

(51) Int. Cl.
*G02B 27/01* (2006.01)
*G06T 3/40* (2006.01)
(Continued)

(52) U.S. Cl.
CPC ............ *G02B 27/0172* (2013.01); *G06T 3/40* (2013.01); *H04N 13/122* (2018.05);
(Continued)

(58) Field of Classification Search
CPC ............ G02B 27/0172; H04N 13/344; H04N 13/122; H04N 13/398; G06T 3/40
See application file for complete search history.

(56) References Cited

U.S. PATENT DOCUMENTS 6,151,061 A    11/2000  Tokuhashi
8,860,634 B2   10/2014  Benson et al.
(Continued)

FOREIGN PATENT DOCUMENTS

CN    102592569    7/2012
CN    103901622    7/2014
(Continued)

*Primary Examiner* — Fred Tzeng
(74) *Attorney, Agent, or Firm* — JCIPRNET (57) ABSTRACT

A near eye display system including a display screen, a graphic processing unit, a lens group, a focal length adjustment device, an interpupillary distance adjustment device, a detection unit, and a control unit is provided. Positions of a left-eye image and a right-eye image to be displayed on the display screen may be adjusted based on lateral displacement amounts of a left-eye lens and a right-eye lens, such that centers of the left-eye image and the right-eye image are respectively aligned with centers of the left-eye lens and the right-eye lens. Sizes (magnification) of the left-eye image and the right-eye image to be displayed on the display screen may be adjusted based on longitudinal displacement amounts of the left-eye lens and the right-eye lens, such that sizes of a visual left-eye image and a visual right-eye image seen by a user are identical. Operation methods thereof are also provided.

18 Claims, 8 Drawing Sheets

US 11,640,061 B2
Page 2

(51) Int. Cl.
*H04N 13/398* (2018.01)
*H04N 13/344* (2018.01)
*H04N 13/122* (2018.01)
*H04N 13/327* (2018.01)

(52) U.S. Cl.
CPC ......... *H04N 13/344* (2018.05); *H04N 13/398* (2018.05); *G02B 2027/014* (2013.01); *G02B 2027/0134* (2013.01); *G02B 2027/0141* (2013.01); *H04N 13/327* (2018.05); *H04N 2213/001* (2013.01); *H04N 2213/002* (2013.01)

(56) References Cited

U.S. PATENT DOCUMENTS

| | | | |
|---|---|---|---|
| 9,298,012 B2 | 3/2016 | Bohn et al. | |
| 9,720,231 B2 | 8/2017 | Erinjippurath et al. | |
| 10,955,667 B2* | 3/2021 | Chang | G02B 7/12 |
| 2001/0055152 A1 | 12/2001 | Richards | |
| 2004/0150884 A1 | 8/2004 | Domjan et al. | |
| 2004/0212776 A1 | 10/2004 | Spitzer et al. | |
| 2010/0060857 A1 | 3/2010 | Richards et al. | |
| 2012/0169725 A1 | 7/2012 | Shimizu et al. | |
| 2013/0182078 A1 | 7/2013 | Kitaura | |
| 2014/0104685 A1* | 4/2014 | Bohn | G02B 7/12 |
| | | | 359/473 |
| 2015/0378166 A1 | 12/2015 | Richards et al. | |
| 2017/0010471 A1 | 1/2017 | Serrano Canovas et al. | |
| 2017/0102549 A1* | 4/2017 | Lee | G02B 27/0179 |
| 2017/0108696 A1 | 4/2017 | Harrison et al. | |
| 2017/0227841 A1 | 8/2017 | Niemela et al. | |
| 2017/0242262 A1 | 8/2017 | Fuchs et al. | |
| 2017/0252216 A1 | 9/2017 | Maeda et al. | |
| 2017/0318281 A1 | 11/2017 | Edlund et al. | |
| 2017/0322624 A1 | 11/2017 | Niccolini et al. | |
| 2017/0344107 A1* | 11/2017 | Aghara | G06F 3/011 |
| 2018/0335605 A1 | 11/2018 | Chou et al. | |
| 2020/0368616 A1* | 11/2020 | Delamont | A63F 13/213 |

FOREIGN PATENT DOCUMENTS

| | | |
|---|---|---|
| CN | 105974582 | 9/2016 |
| CN | 106054386 | 10/2016 |
| CN | 205787390 | 12/2016 |
| CN | 205826969 | 12/2016 |
| CN | 206301085 | 7/2017 |

* cited by examiner

Adjusting a longitudinal distance between the left-eye lens and a left-eye of a user and a longitudinal distance between the right-eye lens and a right-eye of the user, or adjusting a longitudinal distance between the left-eye display device and the left-eye lens and a longitudinal distance between the right-eye display device and the right-eye lens by the focal length adjustment device ~710

Detecting longitudinal displacement amounts of the left-eye lens and the right-eye lens by the detection unit ~720

Performing a calculation for different visual magnifications included by a left-eye image and a right-eye image to be displayed on the display screen by the control unit according to the longitudinal displacement amounts of the left-eye lens and the right-eye lens detected by the detection unit and determining compensation rates of the left-eye image and the right-eye image according to a result of the calculation ~730

Displaying a compensated left-eye image and a compensated right-eye image on the display screen by the graphic processing unit according to the compensation rates of the left-eye image and the right-eye image determined by the control unit such that sizes of a left-side visual image and a right-side visual image seen by the user are identical ~740

NEAR EYE DISPLAY SYSTEM AND OPERATION METHOD THEREOF

CROSS-REFERENCE TO RELATED APPLICATION

This application is a continuation application of and claims the priority benefit of a prior application Ser. No. 15/826,688, filed on Nov. 30, 2017, which claims Taiwan application serial no. 106125974, filed on Aug. 1, 2017. The entirety of each of the above-mentioned patent applications is hereby incorporated by reference herein and made a part of this specification.

BACKGROUND OF THE INVENTION

1. Field of the Invention

The invention relates to display systems and operation methods thereof, and more particularly, to near eye display systems and operation methods thereof.

2. Description of Related Art

On the market, a near eye display used in Virtual Reality (VR) applications generally includes lenses and a display screen. The lenses are disposed between human eyes and the display screen, and the display screen is disposed within focuses of the lenses, so that images on the display screen can pass through the lenses and be formed into erected magnified virtual images at the back of the display screen. Since different users may have different interpupillary distances and refractive powers (e.g., diopters for nearsightedness or farsightedness), some of the near-eye displays on the market are designed to allow the user to manually adjust a longitudinal position (a front-back position) of the device according to the refractive powers (e.g., diopters for near-sightedness or farsightedness) and adjust a lateral position (a left-right position) of the device according to the interpupillary distance. A common near eye display is disposed with two lenses (a left-eye lens and a right-eye lens) and two display devices (a left-eye display device and a right-eye display device) corresponding to a left-eye and a right-eye of the user, and the display devices move together with the lenses when a lateral movement is required. In this way, when the left-right positions of the two lenses are adjusted in response to the interpupillary distance, the two display devices will also move correspondingly so image centers of two images in the two display devices also changes accordingly.

However, in some simplified near eye displays, the two display devices are fixed rather than moving together with the lenses, or the two lenses share one display device capable of simultaneously displaying two images. As such, positions of the left-eye image and the right-eye image displayed by the display device are fixed. Therefore, after the lateral positions of the two lenses are adjusted, two lens centers (equivalent to sight centers of the eyes) will be deviated from the two image centers. As a result, the same image focused by the sight centers of the left-eye and the right-eye of the user will not be at the correct positions, and thus it is difficult for the eyes to focus. Further, when the refractive powers of the user's eyes are different, it is usually required to adjust the longitudinal positions of the two lenses in order to obtain a clear image. However, when the longitudinal positions of the two lenses relative to the display device are different, magnifications of two visual images will be different such that the images being seen by the eyes are in different sizes. The problems above will have a negative impact on a viewing quality of the near-eye display. Accordingly, finding a way to solve the negative impact on the viewing quality caused by adjusting the positions of the device is one of important problems to be solved by developers in the field.

SUMMARY OF THE INVENTION

The invention provides near eye display systems, which can provide a favorable viewing quality.

The invention also provides two operation methods for the near eye display systems.

A near eye display system of the invention includes a display screen, a graphic processing unit, a lens group, an interpupillary distance adjustment device, a detection unit, and a control unit. The display screen displays a left-eye image and a right-eye image. The graphic processing unit is coupled to the display screen, and controls positions of the left-eye image and the right-eye image on the display screen. The lens group includes a left-eye lens and a right-eye lens. The left-eye lens is disposed on an optical transmission path of the left-eye image, and the right-eye lens is disposed on an optical transmission path of the right-eye image. The interpupillary distance adjustment device controls a lateral distance between the left-eye lens and the right-eye lens. The detection unit detects longitudinal displacement amounts of the left-eye lens and the right-eye lens. The control unit is coupled to the graphic processing unit, the interpupillary distance adjustment device and the detection unit. The control unit correspondingly adjusts the positions of the left-eye image and the right-eye image displayed on the display screen according to the lateral displacement amounts of the left-eye lens and the right-eye lens detected by the detection unit such that a center of the left-eye image displayed on the display screen is aligned with a center of the left-eye lens and a center of the right-eye image displayed on the display screen is aligned with a center of the right-eye lens.

A near eye display system of the invention includes a display screen, a graphic processing unit, a lens group, a focal length adjustment device, a detection unit, and a control unit. The display screen displays a left-eye image and a right-eye image. The graphic processing unit is coupled to the display screen, and controls sizes of the left-eye image and the right-eye image on the display screen. The lens group includes a left-eye lens and a right-eye lens. The left-eye lens is disposed on an optical transmission path of the left-eye image, and the right-eye lens is disposed on an optical transmission path of the right-eye image. The focal length adjustment device controls a longitudinal distance between the left-eye lens and a left-eye of a user and a longitudinal distance between the right-eye lens and a right-eye of the user. The detection unit detects longitudinal displacement amounts of the left-eye lens and the right-eye lens. The control unit is coupled to the graphic processing unit, the focal length adjustment device and the detection unit. The control unit correspondingly adjusts the sizes of the left-eye image and the right-eye image displayed on the display screen according to the longitudinal displacement amounts of the left-eye lens and the right-eye lens such that sizes of a left-side visual image and a right-side visual image seen by the user are identical.

A near eye display system of the invention includes a display screen, a graphic processing unit, a lens group, a focal length adjustment device, a detection unit, and a control unit. The display screen includes a left-eye display device for displaying a left-eye image and a right-eye display device for displaying a right-eye image. The graphic processing unit is coupled to the display screen, and controls sizes of the left-eye image and the right-eye image on the display screen. The lens group includes a left-eye lens and a right-eye lens. The left-eye lens is disposed on an optical transmission path of the left-eye image, and the right-eye lens is disposed on an optical transmission path of the right-eye image. The focal length adjustment device controls a longitudinal distance between the left-eye display device and the left-eye lens and a longitudinal distance between the right-eye display device and the right-eye lens. The detection unit detects longitudinal displacement amounts of the left-eye display device and the right-eye display device. The control unit is coupled to the graphic processing unit, the focal length adjustment device and the detection unit. The control unit correspondingly adjusts the sizes of the left-eye image and the right-eye image displayed on the display screen according to the longitudinal displacement amounts of the left-eye display device and the right-eye display device such that sizes of a left-side visual image and a right-side visual image seen by the user are identical.

An operation method of the invention is for a near eye display system. The near eye display system includes a display screen, a graphic processing unit, a lens group, an interpupillary distance adjustment device, a detection unit, and a control unit. The lens group includes a left-eye lens and a right-eye lens. The operation method includes following steps of: adjusting a lateral distance between the left-eye lens and the right-eye lens by the interpupillary distance adjustment device such that a center of the left-eye lens is aligned with a center of a left pupil of a user and a center of the left-eye lens is aligned with a right pupil of the user; detecting lateral displacement amounts of the left-eye lens and the right-eye lens by the detection unit; determining positions of a left-eye image and a right-eye image on the display screen by the control unit according to the lateral displacement amounts of the left-eye lens and the right-eye lens detected by the detection unit; and displaying the left-eye image and the right-eye image on the display screen by the graphic processing unit according to the positions of the left-eye image and the right-eye image determined by the control unit, wherein a center of the left-eye image displayed on the display screen is aligned with the center of the left-eye lens, and a center of the right-eye image displayed on the display screen is aligned with the center of the right-eye lens.

An operation method of the invention is for a near eye display system. The near eye display system includes a display screen, a graphic processing unit, a lens group, a focal length adjustment device, a detection unit, and a control unit. The lens group includes a left-eye lens and a right-eye lens. The operation method includes following steps of: adjusting a longitudinal distance between the left-eye lens and a left-eye of a user and a longitudinal distance between the right-eye lens and a right-eye of the user by the focal length adjustment device; detecting longitudinal displacement amounts of the left-eye lens and the right-eye lens by the detection unit; performing a calculation for visual magnifications of a left-eye image and a right-eye image to be displayed on the display screen by the control unit according to the longitudinal displacement amounts of the left-eye lens and the right-eye lens detected by the detection unit and determining compensation rates of the left-eye image and the right-eye image according to a result of the calculation; and displaying a compensated left-eye image and a compensated right-eye image on the display screen by the graphic processing unit according to the compensation rates of the left-eye image and the right-eye image determined by the control unit such that sizes of a left-side visual image and a right-side visual image seen by the user are identical.

An operation method of the invention is for a near eye display system. The near eye display system includes a display screen, a graphic processing unit, a lens group, a focal length adjustment device, a detection unit, and a control unit. The lens group includes a left-eye lens and a right-eye lens, and the display screen has a left-eye display device and a right-eye display device. The operation method includes following steps of: adjusting a longitudinal distance between the left-eye display device and the left-eye lens and a longitudinal distance between the right-eye display device and the right-eye lens by the focal length adjustment device; detecting longitudinal displacement amounts of the left-eye display device and the right-eye display device by the detection unit; performing a calculation for visual magnifications of a left-eye image and a right-eye image to be displayed on the left-eye display device and the right-eye display device by the control unit according to the longitudinal displacement amounts of the left-eye display device and the right-eye display device detected by the detection unit, and determining compensation rates of the left-eye image and the right-eye image according to a result of the calculation; and displaying a compensated left-eye image and a compensated right-eye image respectively on the left-eye display device and the right-eye display device by the graphic processing unit according to the compensation rates of the left-eye image and the right-eye image determined by the control unit such that sizes of a left-side visual image and a right-side visual image seen by the user are identical.

Based on the above, the near eye display systems and the operation methods thereof can be used to adjust the positions of the left-eye image and the right-eye image to be displayed on the display screen according to the lateral displacement amounts of the left-eye lens and the right-eye lens such that the center of the left-eye image is aligned with the center of the left-eye lens and the center of the right-eye image is aligned with the center of the right-eye lens. In addition, the near eye display systems and the operation methods thereof can also be used to correspondingly adjust the sizes (magnification) of the left-eye image and the right-eye image to be displayed on the display screen based on longitudinal displacement amounts of the left-eye lens and the right-eye lens such that sizes of the visual left-eye image and the visual right-eye image seen by the user are identical. As a result, the near eye display systems can provide the favorable viewing quality.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
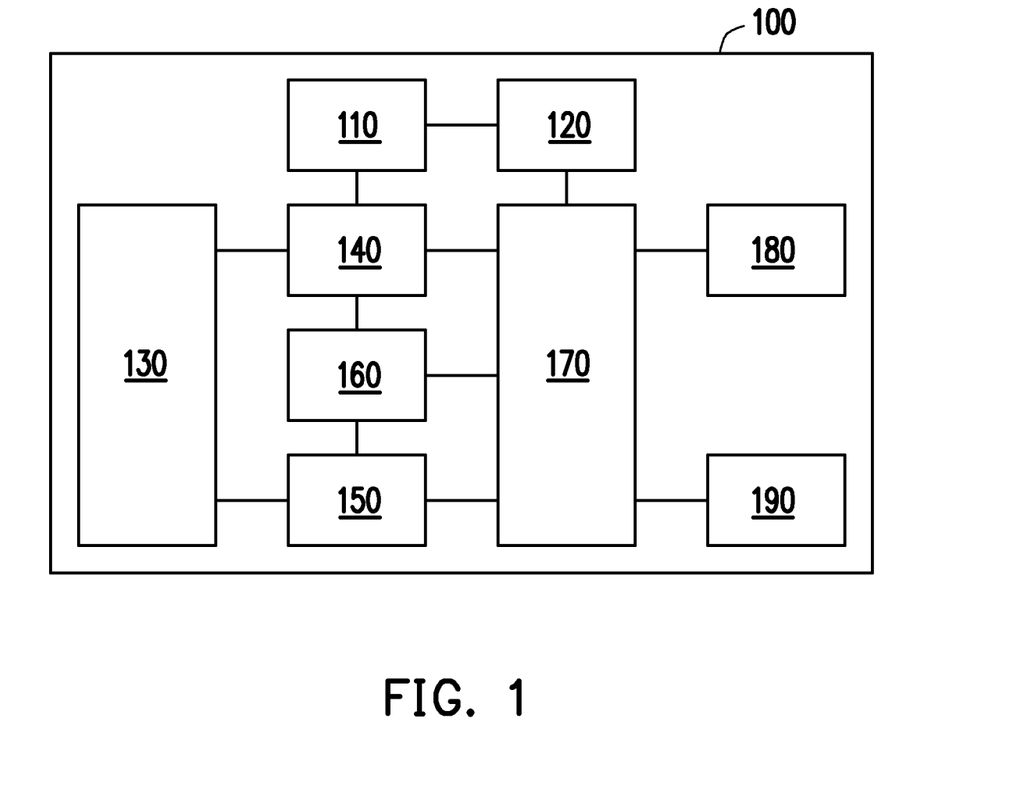
FIG. 1 is a block diagram of a near eye display system according to an embodiment of the invention.
Figure 2A:
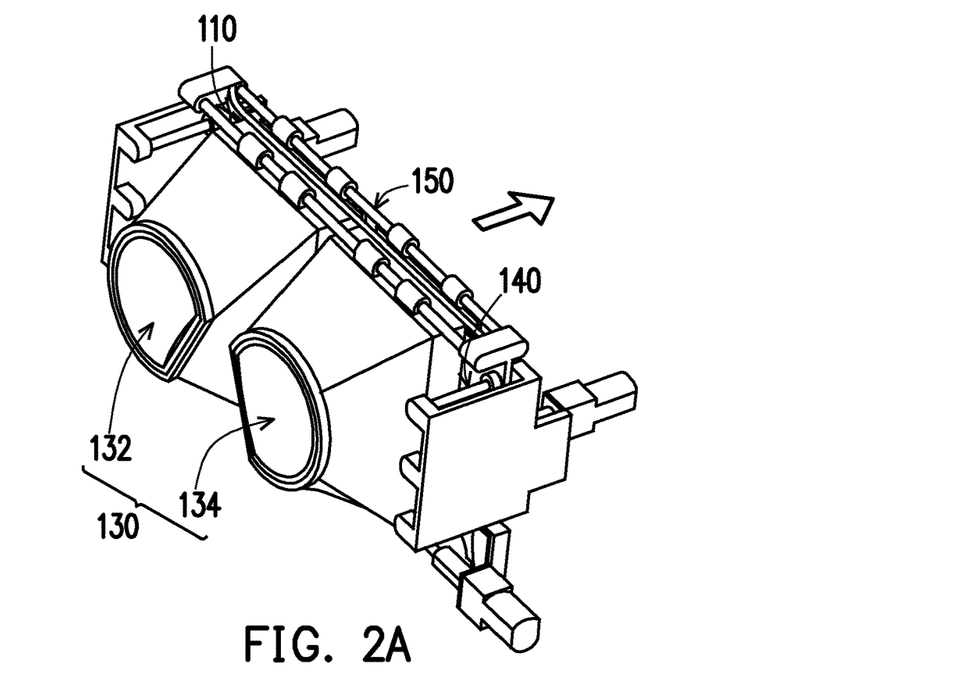
FIG. 2A and FIG. 2B are schematic views of a near eye display system in a longitudinal movement (a front-back movement) according to an embodiment of the invention.
Figure 2B:
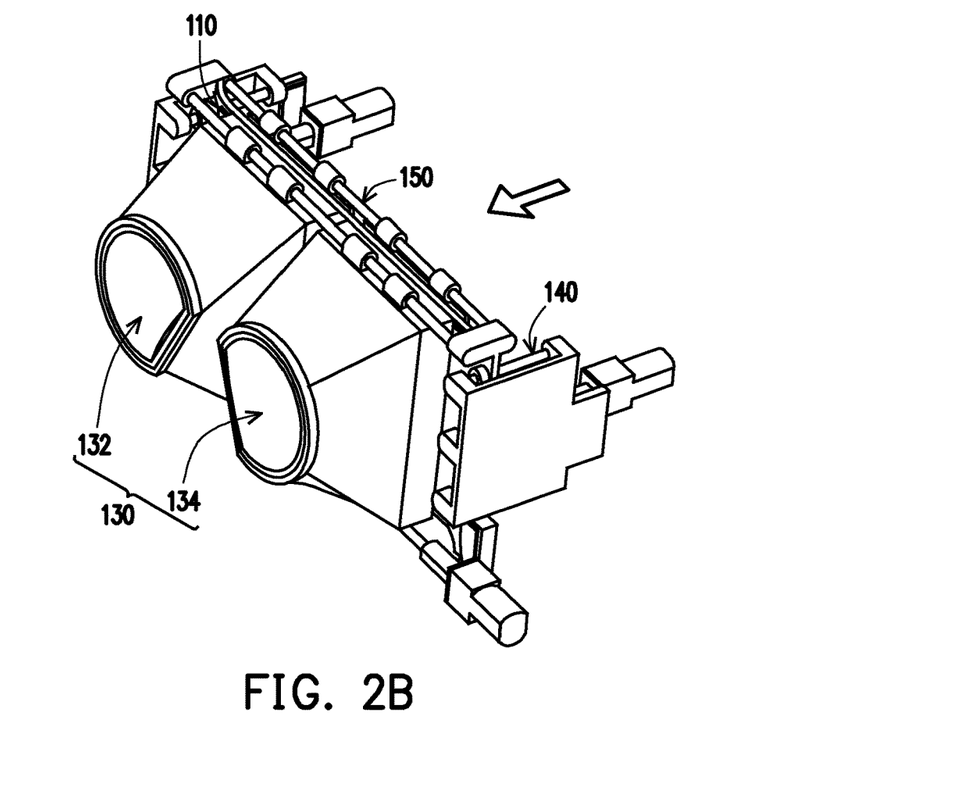
Figure 3A:
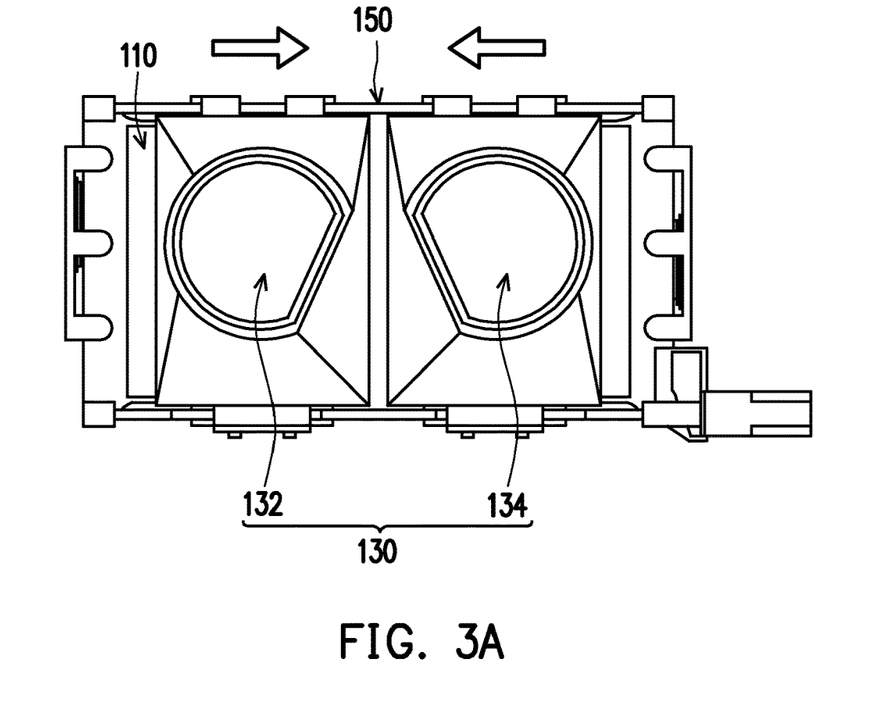
FIG. 3A and FIG. 3B are schematic views of a near eye display system in a lateral movement (a left-right movement) according to an embodiment of the invention.
Figure 3B:
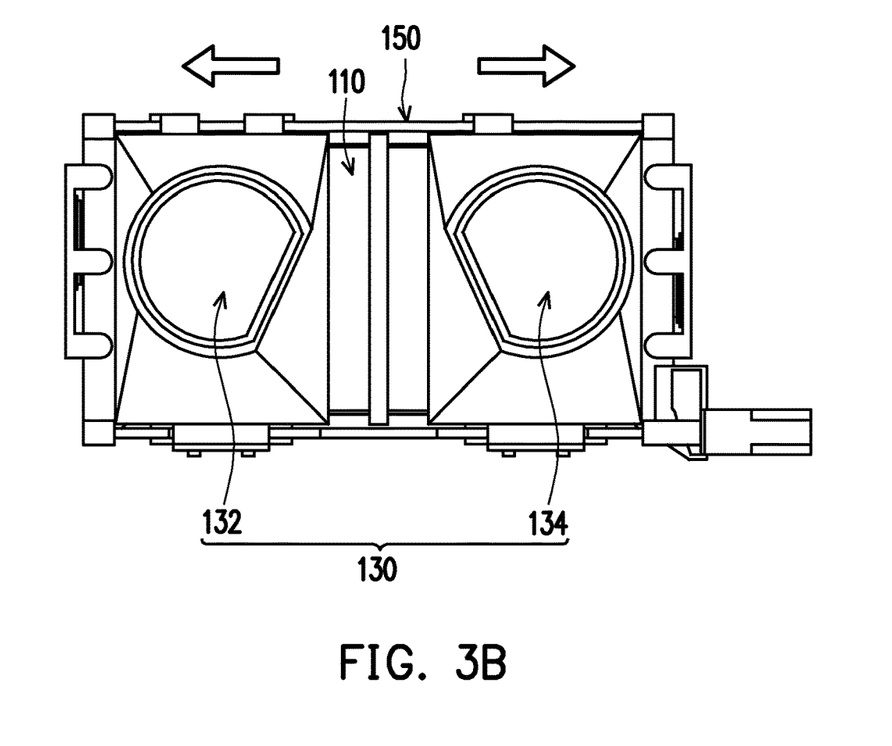
Figure 4A:
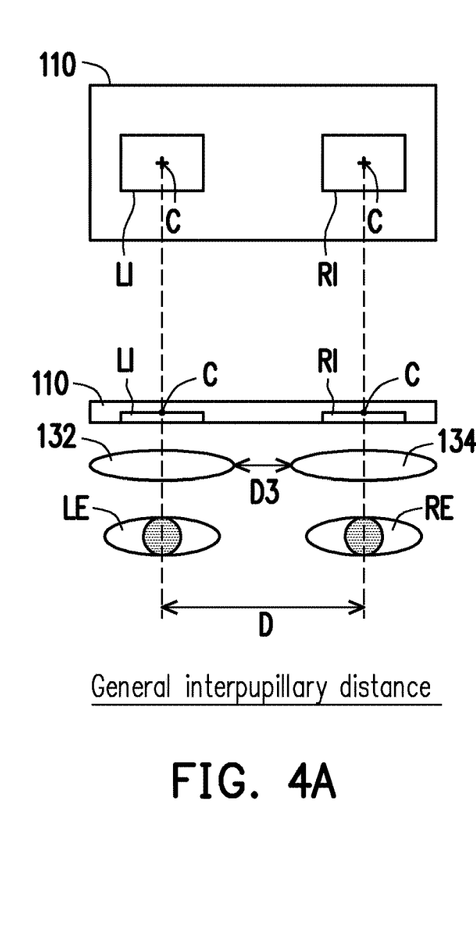
FIG. 4A to FIG. 4C are schematic diagrams for adjusting a center of a left-eye image and a center of a right-eye image according to an interpupillary distance.
Figure 4B:
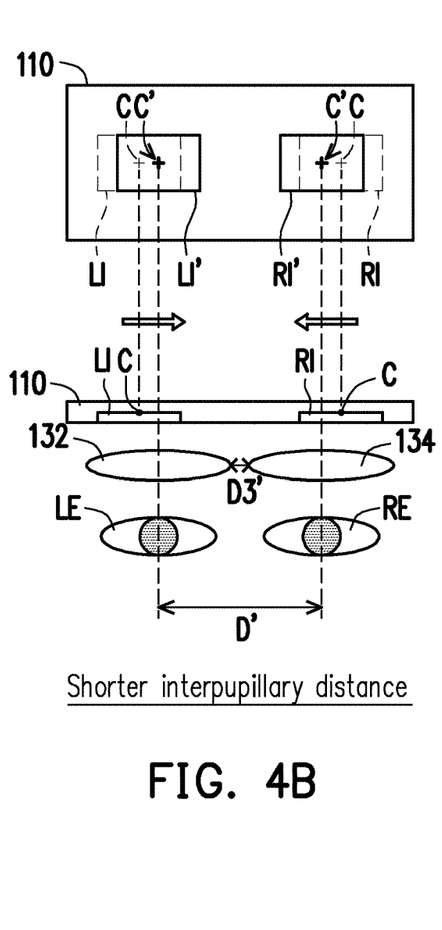
Figure 4C:
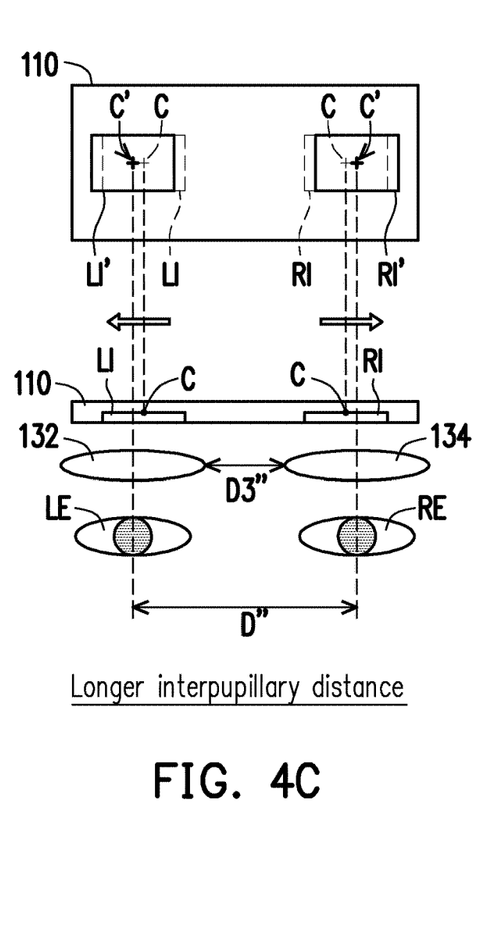
Figure 5:
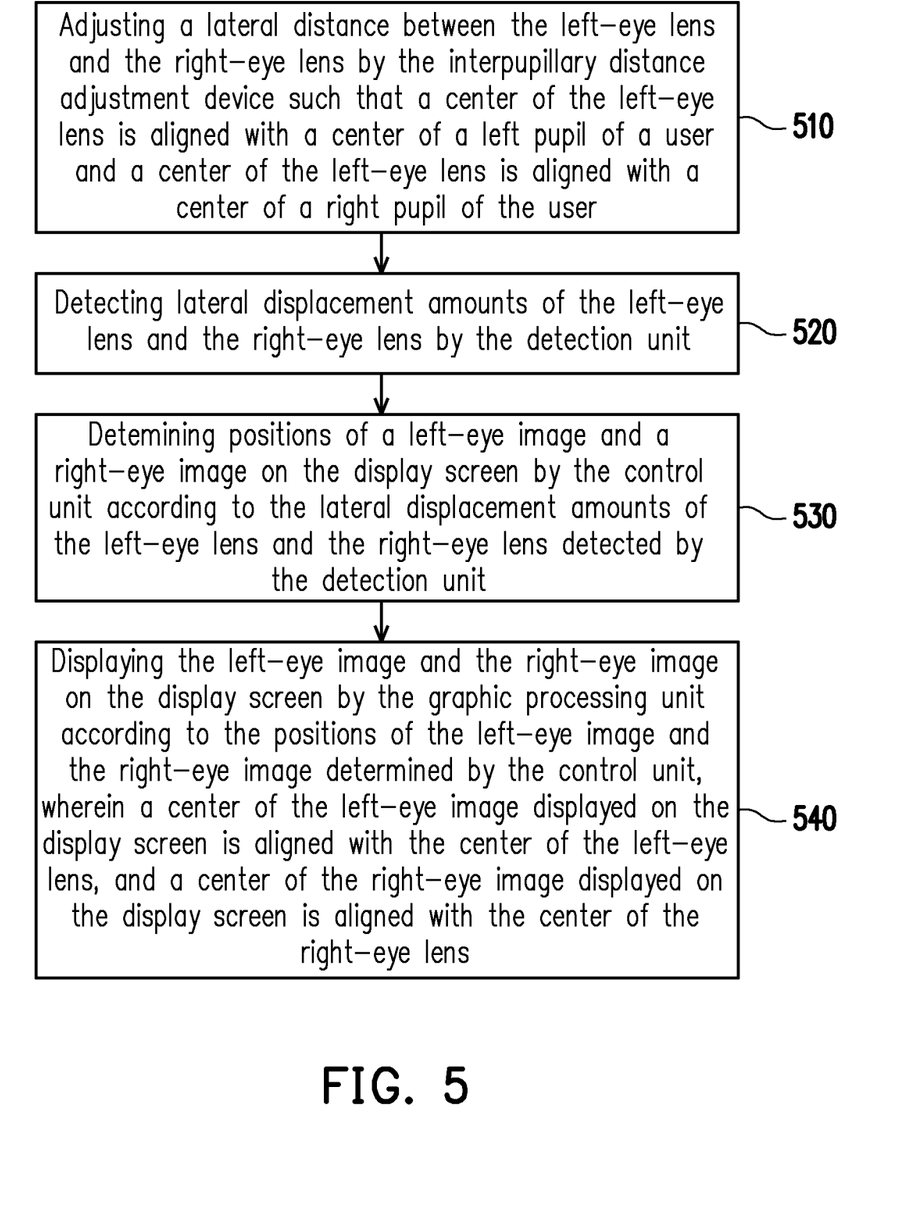
FIG. 5 is a flowchart of an operation method of a near eye display system according to an embodiment of the invention.
Figure 6A:
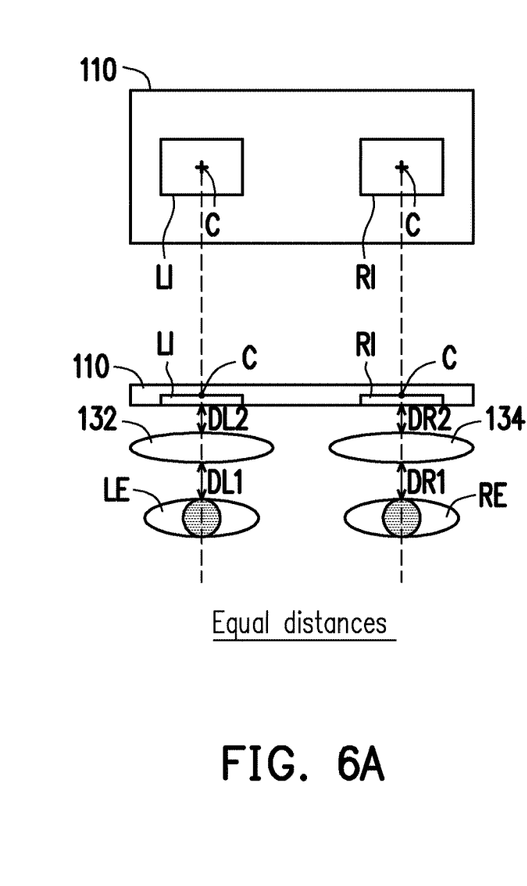
FIG. 6A and FIG. 6C are schematic diagrams for adjusting a size of a left-eye image and a size of a right-eye image according to a left-eye focal length (a left-eye refractive power) and a right-eye focal length (a right-eye refractive power).
Figure 7:
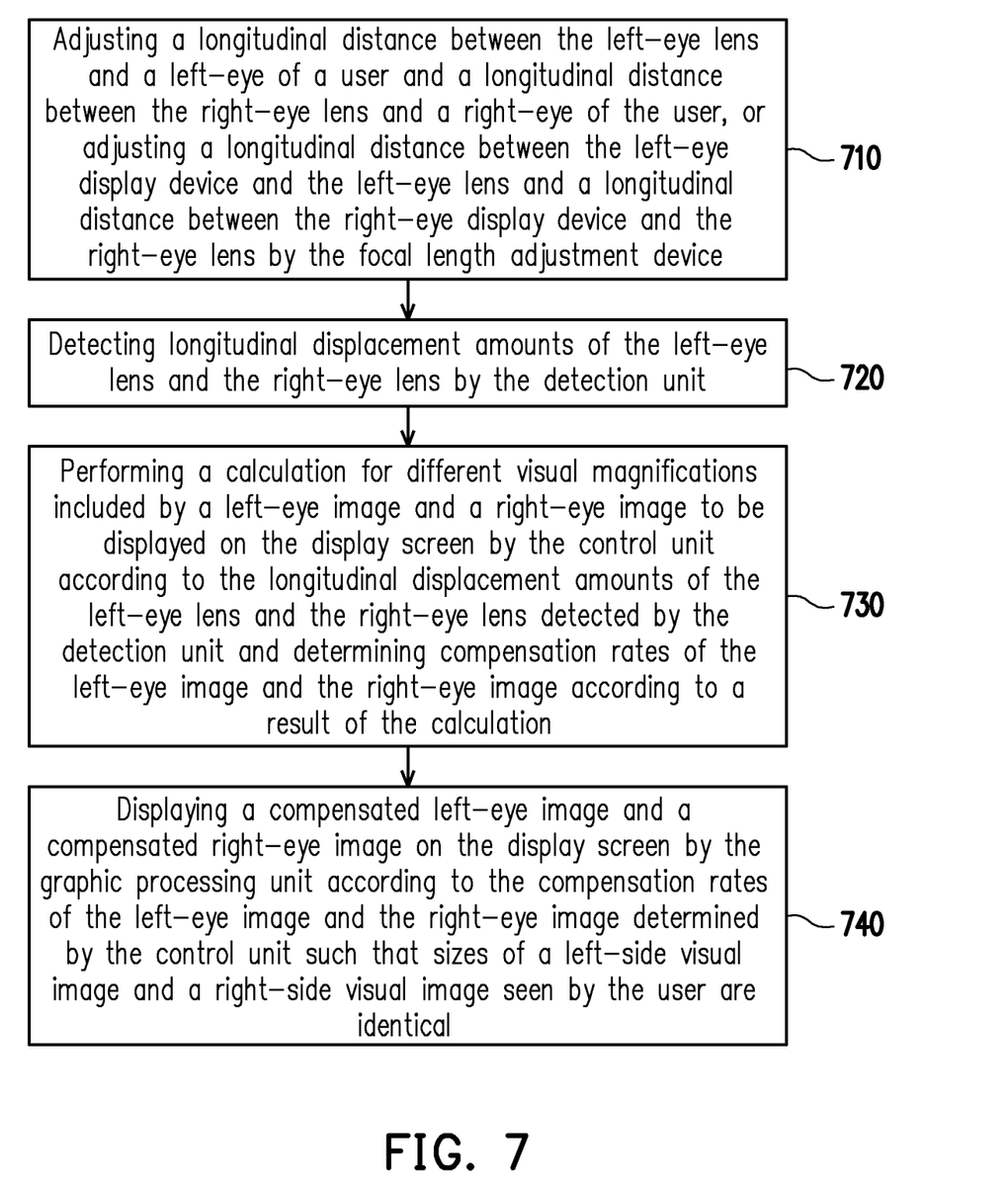
FIG. 7 is a flowchart of an operation method of a near eye display system according to another embodiment of the invention.
Figure 8:
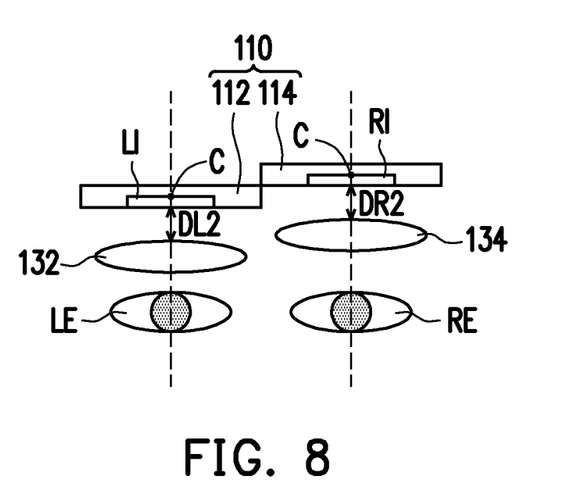
FIG. 8 is a schematic diagram of a near eye display system according to an embodiment of the invention.

FIG. 1 is a block diagram of a near eye display system according to an embodiment of the invention. FIG. 2A and FIG. 2B are schematic views of a near eye display system in a longitudinal movement (a front-back movement) according to an embodiment of the invention. FIG. 3A and FIG. 3B are schematic views of a near eye display system in a lateral movement (a left-right movement) according to an embodiment of the invention. FIG. 4A to FIG. 4C are schematic diagrams for adjusting a center of a left-eye image and a center of a right-eye image according to an interpupillary distance. FIG. 5 is a flowchart of an operation method of a near eye display system according to an embodiment of the invention. FIG. 6A and FIG. 6C are schematic diagrams for adjusting a size of a left-eye image and a size of a right-eye image according to a left-eye focal length (a left-eye refractive power) and a right-eye focal length (a right-eye refractive power). FIG. 7 is a flowchart of an operation method of a near eye display system according to another embodiment of the invention. FIG. 8 is a schematic diagram of a near eye display system according to an embodiment of the invention.

Lower halves of FIG. 4A to FIG. 4C and FIG. 6A to FIG. 6C are top views of a display screen and a lens group in the near eye display system, which are used to represent relative positions of the left-eye image before adjustment and the right-eye image before adjustment displayed by the display screen relative to the lens group and eyes of a user. Upper halves of FIG. 4A and FIG. 4C and FIG. 6A to FIG. 6C are front views of the display screen, which are used to represent positions or sizes of the adjusted left-eye image and the adjusted right-eye image displayed by the display screen.

In the embodiments of the invention, the near eye display system is, for example, a portable virtual reality (VR) system, which can be put on a head portion of the user so the user can experience a virtual world constructed from a computer-simulated real environment using a near eye display technology. However, the displayed content and applications of the near eye display system are not limited to the above.

Referring to FIG. 1, a near eye display system 100 according to an embodiment of the invention includes a display screen 110, a graphic processing unit 120, a lens group 130, a focal length adjustment device 140, an interpupillary distance adjustment device 150, a detection unit 160, and a control unit 170.

Referring to FIG. 1 and FIG. 8 together, the display screen 110 displays a left-eye image LI and a right-eye image RI, and the display screen 110 may include any display device adapted to display images such as a liquid crystal display device or an organic electro-luminescence display device, but the invention is not limited thereto. For instance, as shown in FIG. 8, the display screen 110 may be a double-piece display device, and the double-piece display device includes a left-eye display device 112 and a right-eye display device 114. The left-eye display device 112 displays the left-eye image LI, and the right-eye display device 114 displays the right-eye image RI. Alternatively, as shown in FIG. 4A to FIG. 4C and FIG. 6A to FIG. 6C, the display screen 110 may also be a single-piece display device, and the left-eye image LI and the right-eye image RI are respectively displayed on a left-half and a right-half of the single-piece display device. In comparison with the double-piece display device, the single-piece display device can omit complicated mechanical structure and reduce manufacturing costs. In comparison with the single-piece display device, the double-piece display device can allow the display screen 110 to be adjusted in synchronism with the lens group 130.

Referring back to FIG. 1, the graphic processing unit 120 is coupled to the display screen 110 to control positions and sizes of the left-eye image and the right-eye image on the display screen 110. In addition, the graphic processing unit 120 is also coupled to the control unit 170 to assist the control unit 170 in execution of graphical operation, e.g., processing data regarding a facing direction of the user's head portion and a watching direction of the user's eyes provided by the control unit 170.

Referring to FIG. 1 and FIG. 4A together, the lens group 130 includes a left-eye lens 132 and a right-eye lens 134. The left-eye lens 132 is disposed on an optical transmission path of the left-eye image LI. The right-eye lens 134 is disposed on an optical transmission path of the right-eye image RI. By respectively disposing the left-eye image LI and the right-eye image RI within focuses (not illustrated) of the left-eye lens 132 and the right-eye lens 134, the left-eye image LI and the right-eye image RI are respectively refracted by the left-eye lens 132 and the right-eye lens 134 to generate magnified erected virtual images at the back (e.g., a clear sight distance of the user) of the display screen 110. The magnified erected virtual images will be the image seen by the user.

As shown in FIG. 2A to FIG. 3B, the left-eye lens 132 and the right-eye lens 134 may be fixed onto two mechanical structures (e.g., cylindrical structures as illustrated in the drawing), respectively. The two mechanical structures are structurally separated from each other and respectively connected to the focal length adjustment device 140 and the interpupillary distance adjustment device 150. Accordingly, the left-eye lens 132 and the right-eye lens 134 fixed on the two mechanical structures can conduct a longitudinal movement (a front-back movement) through the focal length adjustment device 140 and can conduct a lateral movement (a left-right movement) through the interpupillary distance adjustment device 150.

Specifically, as shown in FIG. 2A, FIG. 2B and FIG. 6A, the focal length adjustment device 140 can control a lateral distance DL1 between the left-eye lens 132 and a left-eye LE of the user and a lateral direction DR1 between the right-eye lens 134 and a right-eye RE of the user such that the left-eye LE and the right-eye RE of the user can both see a clear image. The focal length adjustment device 140 may be a mechanical structure adjustable by a manual adjustment or a power-based adjustment. In the case of the power-based adjustment, the focal length adjustment device 140 is coupled to the control unit 170. The control unit 170 instructs the focal length adjustment device 140 to modulate a longitudinal displacement amount of the left-eye lens 132 or the right-eye lens 134 according to commands from the user. Alternatively, with automatic settings, the control unit 170 can determine the longitudinal displacement amount of the left-eye lens 132 or the right-eye lens 134 according to the left-eye focal length (the left-eye refractive power) and the right-eye focal length (the right-eye refractive power) detected by the detection unit 160, and can instruct the focal length adjustment device 140 to modulate the longitudinal displacement amount of the left-eye lens 132 or the right-eye lens 134.

In the case where the display screen 110 is the double-piece display device, as shown in FIG. 8, the focal length adjustment device 140 can further control longitudinal displacement amounts of the left-eye display device 112 and the right-eye display device 114, so as to control a longitudinal distance between the left-eye display device 112 and the left-eye LE of the user and a longitudinal distance between the right-eye display device 114 and the right-eye RE of the user. In the embodiment of FIG. 8, each display device moves with the corresponding lens, such that a longitudinal distance DL2 between the left-eye display device 112 and the left-eye lens 132 is a fixed value, and a longitudinal distance DR2 between the right-eye display device 114 and the right-eye lens 134 is a fixed value. For instance, the distance between each display device and the corresponding lens can be fixed by a mechanical member. Alternatively, each display device may be connected to the focal length adjustment device 140 so each display device can move together with the corresponding lens, but the invention is not limited thereto.

As shown in FIG. 3A, FIG. 3B and FIG. 4A, the interpupillary distance adjustment device 150 can control a lateral distance D3 between the left-eye lens 132 and the right-eye lens 134 so a center of each lens is aligned with a center of the corresponding eye for allowing the user to comfortably see the left-eye image LI and the right-eye image RI. The interpupillary distance adjustment device 150 may be a mechanical structure adjustable by a manual adjustment or a power-based adjustment. In the case of the power-based adjustment, the interpupillary distance adjustment device 150 is coupled to the control unit 170. The control unit 170 instructs the interpupillary distance adjustment device 150 to modulate a lateral displacement amount of the left-eye lens 132 or the right-eye lens 134 according to commands from the user. Alternatively, with automatic settings, the control unit 170 can determine the lateral displacement amounts of the left-eye lens 132 and the right-eye lens 134 according to an interpupillary distance of the user detected by the detection unit 160, and instructs the interpupillary distance adjustment device 150 to modulate the lateral displacement amounts of the left-eye lens 132 and the right-eye lens 134. Herein, a method for adjusting the lateral displacement amount may be modulating the lateral displacement amount of the left-eye lens 132 and the lateral displacement amount of the right-eye lens 134 separately, or may be modulating the lateral displacement amount of the left-eye lens 132 and the lateral displacement amount of the right-eye lens 134 synchronously at a constant speed and at one time.

Referring to FIG. 1 to FIG. 3B, the detection unit 160 detects the longitudinal displacement amounts of the left-eye lens 132 and the right-eye lens 134 and the lateral displacement amounts of the left-eye lens 132 and the right-eye lens 134. In addition, the detection unit 160 may also detect a position of the user in virtual reality, the facing direction of the user's head portion, the watching direction of the user's eyes, the interpupillary distance, the left-eye focal length and the right-eye focal length of the user. For instance, the detection unit 160 may include one or more detection elements. The detection elements may be mechanical, electronic or optical detection elements. Besides, the detection unit 160 is coupled to the control unit 170 so as to transmit a detected result to the control unit 170. In the embodiment, the detection unit 160 indirectly calculates the actual lateral displacement amounts of the left-eye lens 132 and the right-eye lens 134 by detecting an adjustment amount of the interpupillary distance adjustment device 150, and indirectly calculates the actual longitudinal displacement amounts of the left-eye lens 132 and the right-eye lens 134 by detecting an adjustment amount of the focal length adjustment device 140. Naturally, in another embodiment, the detection unit 160 may also directly detect actual distances moved by the left-eye lens 132 and the right-eye lens 134 in longitudinal direction or/and in lateral direction, so as to obtain the lateral displacement amount or/and the longitudinal displacement amount, respectively.

The control unit 170 is coupled to the graphic processing unit 120, the focal length adjustment device 140, the interpupillary distance adjustment device 150 and the detection unit 160. The control unit 170 can control the focal length adjustment device 140 and the interpupillary distance adjustment device 150 according to commands from the user, so as to adjust positions of the left-eye lens 132, the right-eye lens 134 and the display screen 110. Alternatively, the control unit 170 may control the focal length adjustment device 140 and the interpupillary distance adjustment device 150 according to the result detected by the detection unit 160, so as to adjust the positions of the left-eye lens 132, the right-eye lens 134 and the display screen 110.

Specifically, different users may have different interpupillary distances (a distance between the two pupils). As shown in FIG. 4A, when the interpupillary distance is equal to a general interpupillary distance (which is generally designed to be 65 mm; the interpupillary distance of adult male is between 60 mm and 73 mm, and the interpupillary distance of adult female is between 53 mm and 68 mm), a center C of the left-eye image LI, a center of the left-eye lens 132 and a center of the left-eye LE (a center of a left pupil) of the user will be aligned with one another, whereas a center C of the right-eye image RI, a center of the right-eye lens 134 and a center of the right-eye RE (a center of a right pupil) of the user will be aligned with one another. As such, it is not required to additional adjust the positions of the left-eye lens 132, the right-eye lens 134, the left-eye image LI and the right-eye image RI.

However, as shown in FIG. 4B, when the interpupillary distance of the user is shorter than the normal interpupillary distance, i.e., when a distance D' between the centers of the user's pupils is less than a distance D between the centers of the user's pupils in FIG. 4A, it is required to adjust (reduce) the lateral distance between the left-eye lens 132 and the right-eye lens 134 by the interpupillary distance adjustment device. For example, by making a lateral distance D3' of FIG. 4B less than a lateral distance D3 of FIG. 4A, the center of the left-eye lens 132 may be aligned with the center of the left pupil (the center of the left-eye LE) of the user, and the center of the right-eye lens 134 may be aligned with the center of the right pupil (the center of the right-eye RE) of the user (step 510 of FIG. 5).

For instance, a method for adjusting the lateral distance D3' between the left-eye lens 132 and the right-eye lens 134 may be manually adjusting the interpupillary distance adjustment device by the user. Alternatively, it is also possible that the interpupillary distance adjustment device is controlled by the control unit according to the result detected by the detection unit. Specifically, the center of the left pupil and the center of the right pupil of the user may be detected by the detection unit. The control unit determines the lateral displacement amounts of the left-eye lens 132 and the right-eye lens 134 according to the center of the left pupil and the right pupil of the user detected by the detection unit, and the interpupillary distance adjustment device adjusts the lateral distance between the left-eye lens 132 and the right-eye lens 134 according to the lateral displacement amounts of the left-eye lens 132 and the right-eye lens 134 determined by the control unit, such that the center of the left-eye lens 132 may be aligned with the center of the left pupil and the center of the right-eye lens 134 may be aligned with the center of the right pupil. The lateral displacement amount of the left-eye lens 132 is a length of the distance moved by the left-eye lens 132 for aligning its center with the center of the left pupil (e.g., moved towards the right-eye lens 134), and the lateral displacement amount of the right-eye lens 134 is a length of the distance moved by the right-eye lens 134 for aligning its center with the center of the right pupil (e.g., moved towards the left-eye lens 132).

In the embodiment, a position of the display screen 110 does not change together with the left-eye lens 132 and the right-eye lens 134 when the lateral distance D3' between the left-eye lens 132 and the right-eye lens 134 is adjusted. Accordingly, after the lateral distance D3' between the left-eye lens 132 and the right-eye lens 134 is adjusted, a center of the adjusted left-eye lens 132 is deviated from the center C of the left-eye image LI predetermined according to the general interpupillary distance, and a center of the adjusted right-eye lens 134 is deviated from the center C of the right-eye image RI predetermined according to the general interpupillary distance (as shown by the lower half of FIG. 4B). Therefore, after the lateral distance D3' between the left-eye lens 132 and the right-eye lens 134 is adjusted, it is required to further adjust the center C of the left-eye image LI and the center C of the right-eye image RI.

Steps for adjusting the center C of the left-eye image LI and the center C of the right-eye image RI are provided as follows. The lateral displacement amounts of the left-eye lens 132 and the right-eye lens 134 are detected by the detection unit (step 520 of FIG. 5). Positions of a left-eye image LI' and a right-eye image RI' on the display screen 110 are determined by the control unit according to the lateral displacement amounts of the left-eye lens 132 and the right-eye lens 134 detected by the detection unit (step 530 of FIG. 5). Next, the left-eye image LI' and the right-eye image RI' are displayed on the display screen 110 by the graphic processing unit according to the positions of the left-eye image LI' and the right-eye image RI' on the display screen 110 determined by the control unit, such that a center C' of the left-eye image LI' displayed on the display screen 110 is aligned with the center of the left-eye lens 132, and a center C' of the right-eye image RI' displayed on the display screen 110 is aligned with the center of the right-eye lens 134 (step 540 of FIG. 5, referring to the upper half of FIG. 4B).

On the other hand, as shown in FIG. 4C, when the interpupillary distance is longer than the normal interpupillary distance, i.e., when a distance D" between the centers of the user's pupils is greater than the distance D between the centers of the pupils of FIG. 4A, it is required to adjust (increase) the lateral distance between the left-eye lens 132 and the right-eye lens 134 by the interpupillary distance adjustment device. For example, by making a lateral distance D3" of FIG. 4C greater than the lateral distance D3 of FIG. 4A, the center of the left-eye lens 132 may be aligned with the center of the left pupil (the center of the left-eye LE) of the user and the center of the right-eye lens 134 may be aligned with the center of the right pupil (the center of the right-eye RE) of the user. Similarly, after the lateral distance D3' between the left-eye lens 132 and the right-eye lens 134 is adjusted, it is required to further adjust the center C of the left-eye image LI and the center C of the right-eye image RI. For example, by moving each of the left-eye image LI and the right-eye image RI towards a direction away from the other, the center C' of the left-eye image LI' displayed on the display screen 110 may be aligned with the center of the left-eye lens 132, and the center C' of the right-eye image RI' displayed on the display screen 110 may be aligned with the center of the right-eye lens 134 (referring to the upper half of FIG. 4C).

Figure 6B:
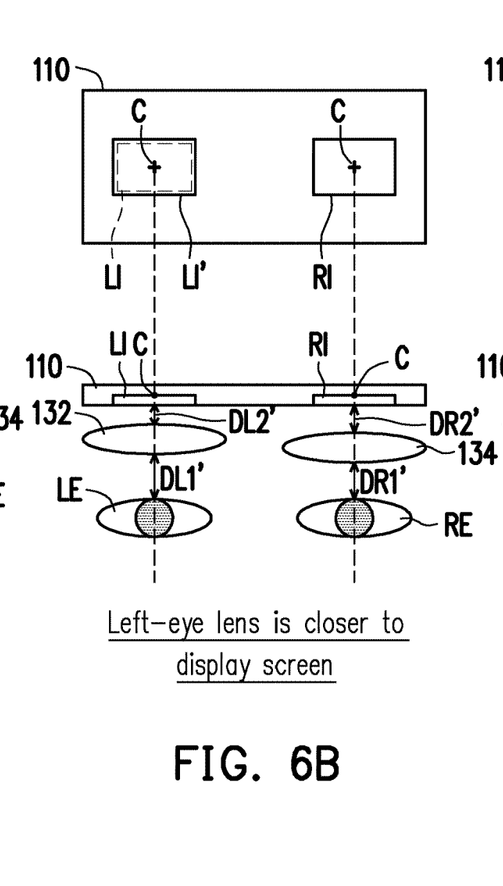
Figure 6C:
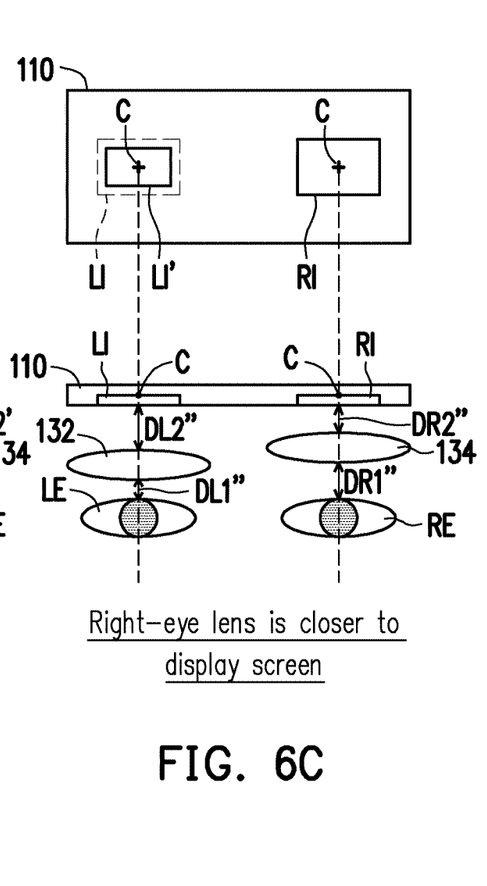

Moreover, as shown in FIG. 6A to FIG. 6C, based on the refractive powers of the user's eyes, it is required to adjust longitudinal distances between the lenses and the user's eyes, so the user is able to see the clear image. As shown in FIG. 6A, when the refractive powers of the user's eyes are identical, the longitudinal distance DL1 between the left-eye lens 132 and the left-eye LE of the user will be identical to the longitudinal distance DR1 between the right-eye lens 134 and the right-eye RE of the user, and the longitudinal distance DL2 between the left-eye lens 132 and the display screen 110 will be identical to the longitudinal distance DR2 between the right-eye lens 134 and the display screen 110. According to the known lens imaging equation, a magnification of the lens to the image is an image size divided by an object size, which is equal to an image distance divided by an object distance. According to the known lens imaging equation, the image distance may be calculated if the object distance (a distance from the object to the lens) and the focal length of the lens are known, and then the image size may also be calculated from there. As for the near eye display system of the application, the so-called object distance refers to a distance from the display screen 110 to the left-eye lens 132 (or the right-eye lens 134); and the so-called image distance refers to a distance from a point where an imaging virtual image is at to the left-eye lens 132 (or the right-eye lens 134). However, a size of visual image viewed by the viewer may correspond to a size of a visual angle. This size of the visual image relates to a size of the imaging virtual image and its distance to the eye. For the imaging virtual images with the same size, when a visual distance thereof is closer, the visual angle is larger and thus the visual image is also larger, and when the visual distance is farther, the visual angle is smaller and thus the visual image is also smaller. After obtaining the distance from the imaging virtual image to the lens plus the distance from the lens to the eye by using the lens imaging equation, the visual angle of the visual image may be calculated by using trigonometry math. Therefore, when the refractive powers of the user's eyes are identical, the left-eye image LI and the right-eye image RI will have the same visual magnification, the same visual distance, and the same size of the visual angle. In other words, the visual angles of a left-side visual image and a right-side visual image (the magnified erected virtual images being seen at the clear sight distance, not illustrated in FIG. 6A to FIG. 6C) seen by the user are identical, i.e., the sizes of the visual images being seen are identical.

Nonetheless, when the refractive powers of the user's eyes are different, it is required to adjust the longitudinal distance between the left-eye lens and the left-eye of the user and a longitudinal distance between the right-eye lens and the right-eye of the user by the focal length adjustment device; or to adjust the longitudinal distance between the left-eye display device and the left-eye lens and the longitudinal distance between the right-eye display device and the right-eye lens by the focal length adjustment device (step 710 in FIG. 7), so the eyes are able to see the clear image.

For instance, a method for adjust the longitudinal distance may be manually controlling the focal length adjustment device by the user. Alternatively, it is also possible that the focal length adjustment device is controlled by the control unit according to the result detected by the detection unit. Specifically, the left-eye focal length (the left-eye refractive power) and the right-eye focal length (the right-eye refractive power) of the user may be detected by the detection unit. The longitudinal displacement amounts of the left-eye lens 132 and the right-eye lens 134 may be determined by the control unit according to the left-eye focal length and the right-eye focal length of the user detected by the detection unit, and the focal length adjustment device correspondingly adjusts the longitudinal distance between the left-eye lens 132 and the left-eye LE of the user and the longitudinal distance between the right-eye lens 134 and the right-eye RE of the user according to the longitudinal displacement amounts of the left-eye lens 132 and the right-eye lens 134 determined by the control unit.

In FIG. 6B (or FIG. 6C), a position of the display screen 110 does not change together with the left-eye lens 132 and the right-eye lens 134 when a longitudinal distance DL1' (or a longitudinal distance DL1") between the left-eye lens 132 and the left-eye LE of the user and a longitudinal distance DR1' (or a longitudinal distance DR1") between the right-eye lens 134 and the right-eye RE of the user are adjusted. In other words, the longitudinal distances from the display screen 110 to the user's eyes are fixed. In response to the difference between the left-eye focal length (the left-eye refractive power) and the right-eye focal length (the right-eye refractive power) of the user, only the position of the lens (the left-eye lens 132 or the right-eye lens 134) between the display screen 110 and the corresponding eye is modulated. Therefore, a sum of the longitudinal distance DL1'(or the longitudinal distance DL1") between the left-eye lens 132 and the left-eye LE and the longitudinal distance DL2'(or the longitudinal distance DL2") of the left-eye lens 132 and the display screen 110 is equal to a sum of the longitudinal distance DR1' (or the longitudinal distance DR1") between the right-eye lens 134 and the right-eye RE and the longitudinal distance DR2'(or the longitudinal distance DR2") between the right-eye lens 134 and the display screen 110. In the case where the display screen 110 is the double-piece display device, as shown in FIG. 8, the left-eye display device 112 moves together with the left-eye lens 132 when the longitudinal distance between the left-eye lens 132 and the left-eye LE of the user is adjusted, and the right-eye display device 114 also moves together with the right-eye lens 134 when the longitudinal distance between the right-eye lens 134 and the right-eye RE of the user is adjusted.

To simplify the description, FIG. 6B and FIG. 6C illustrate a situation where the position of the right-eye lens 134 is fixed and only the position of the left-eye lens 132 is changed. In FIG. 6B, the left-eye lens 132 moves towards the display screen 110, such that the left-eye lens 132 is closer to the display screen 110 than the right-eye lens 134. The visual magnification (corresponding to the size of the visual angle) may be calculated by using trigonometry math together with the magnification of the imaging virtual image and the distance from the imaging virtual image to the eye. In other words, if the sizes of the left-eye image LI and the right-eye image RI displayed by the display screen 110 are identical, a size of the left-side visual image seen by user will be different from a size of the right-side visual image seen by the user. Therefore, after the longitudinal distances (e.g., the longitudinal distances DL1' and DL2') are adjusted, it is required to further compensate the difference between the visual magnifications of the images seen by the eyes.

Steps for compensating the difference may include the followings. The lateral displacement amounts of the left-eye lens 132 and the right-eye lens 134 are detected by the detection unit (step 720 of FIG. 7) e.g., a distance moved by the left-eye lens 132 towards the display screen 110 is detected. A calculation for visual magnifications of the left-eye image LI and the right-eye image RI to be displayed on the display screen 110 and viewed by the viewer is performed by the control unit according to the longitudinal displacement amounts of the left-eye lens 132 and the right-eye lens 134 detected by the detection unit and compensation rates of the left-eye image LI and the right-eye image RI are determined according to a result of the calculation (step 730 of FIG. 7). It can be set that person with normal eyesight can see the imaging virtual image at the place approximately 25 cm away from the eyes in general. For those having the eyesight with refractive error (e.g., nearsightedness or farsightedness), the place where the imaging virtual image can be clearly seen will be less than or greater than 25 cm away from the eyes. Based on the above, it is assumed that the visual magnification of the normal eyesight is N, the visual magnification of the left-eye is ML and the visual magnification of the right-eye is MR as the result detected by the detection unit. Based on that assumption, ratios of the eyes to the visual magnifications of the normal eyesight will be: ML/N for the left-eye and MR/N for the right-eye. For making the image sizes seen by the eyes identical, the compensation magnifications will be reciprocals of aforesaid ratios of the eyes to the visual magnifications, which are: N/ML for the left-eye and N/MR for the right-eye. A compensated left-eye image LI' and a compensated right-eye image RI' are displayed on the display screen 110 by the graphic processing unit according to the compensation rates of the left-eye image LI and the right-eye image RI determined by the control unit such that sizes of a left-side visual image and a right-side visual image seen by the user are identical (step 740 of FIG. 7). It should be noted that, one of the sizes of the compensated images may be identical to, less than or greater than the size before compensation. For example, in the embodiments of FIG. 6B and FIG. 6C, the size of the compensated right-eye image is equal to the size of the right-eye image RI before compensation.

In the case of FIG. 6B, when the sizes of the left-eye image LI and the right-eye image RI displayed by the display screen 110 are identical, if the visual magnification of the left-eye image LI is ML and the visual magnification of the right-eye image RI is MR, ML will be greater than MR according to the calculation for the visual magnification described above. In other words, if no compensation is made to the sizes of the left-eye image LI and the right-eye image RI, the size of the left-side visual image seen by the user at the clear sight distance will be greater than the size of the right-side visual image seen by the user at the clear sight distance. In order to compensate the difference in the sizes caused by the different visual magnifications, the control unit can determine the compensation rate of the right-eye image RI to be N/MR and the compensation rate of the left-eye image LI to be N/ML (here, MR=N because the right-eye lens is not adjusted nor moved, i.e., N/MR=1; as shown by the upper half of FIG. 6B, the left-eye image LI is adjusted into the left-eye image LI' according to the compensation rate N/ML, whereas the right-eye image RI remains unchanged). With the pre-compensation mechanism described above, the sizes of the left-side visual image seen by the user and the right-side visual image seen by the user may be identical. The sizes being identical refer to situations where the sizes are the same and the sizes are approximately the same. It should be noted that, although only the size of the left-eye image LI is modulated in FIG. 6B, the invention is not limited thereto. In another embodiment, it is possible that only the size of the right-eye image RI is modulated. In yet another embodiment, it is also possible that both the sizes of the left-eye image LI the right-eye image RI are both modulated.

In FIG. 6C, the left-eye lens 132 moves towards the left-eye LE, such that the right-eye lens 134 may be closer to the display screen 110 than the left-eye lens 132. The visual magnification of the image (corresponding to the size of the visual angle) may be calculated by using trigonometry math together with the magnification of the imaging virtual image and the distance from the imaging virtual image to the eye. Accordingly, the visual magnification of the left-eye image LI is less than the visual magnification of the right-eye image RI. In other words, if the sizes of the left-eye image LI and the right-eye image RI displayed by the display screen 110 are identical, a size of the left-side visual image seen by user will be less than a size of the right-side visual image. Therefore, after the longitudinal distances (e.g., the longitudinal distances DL1' and DL2') are adjusted, it is required to further compensate the difference between the visual magnifications of the images seen by the eyes.

In the case of FIG. 6C, when the sizes of the left-eye image LI and the right-eye image RI displayed by the display screen 110 are identical, if the visual magnification of the left-eye image LI is ML and the visual magnification of the right-eye image RI is MR, MR will be equal to N and ML will be less than N according to the equation of the visual magnification described above. In order to compensate the difference in the sizes caused by the different visual magnifications, the control unit can determine the compensation rate of the right-eye image RI to be 1 (i.e., the visual magnification is maintained at MR=N), and determine the compensation rate of the left-eye image LI to be N/MR (i.e., the left-eye image LI is adjusted into the left-eye image LI' according to the compensation rate N/ML). With the pre-compensation mechanism described above, the sizes of the left-side visual image seen by the user and the right-side visual image seen by the user may be identical.

As similar to the embodiments regarding FIG. 6A to FIG. 6C and the steps in FIG. 7, in another embodiment of the invention, it is assumed that the display screen of the near eye display system 100 adopts use of two display devices capable of moving separately, the left-eye lens 132 and the right-eye lens 134 are fixed, and the longitudinal distance of the left-eye display device and the longitudinal distance of the right-eye display device are adjusted by the focal length adjustment device. In this case, the detection unit detects longitudinal displacement amounts of the two display devices (instead of the two lenses) and compensate the left-eye image and the right-eye image by the same method described in the foregoing embodiments, such that the sizes of the left-side visual image and the right-side visual image seen by the user can be identical.

Based on different requirements, the near eye display system 100 may further include other elements. For instance, as shown in FIG. 1, the near eye display system 100 may further include a memory unit 180 and an input unit 190. The memory unit 180 is coupled to the control unit 170 and capable of storing processing program, controlling program, image data, temporary data or related data. Further, the memory unit 180 may be used by the control unit 170 and the graphic processing unit 120. For instance, the memory unit 180 may be a general memory, a flash memory, a solid state disk, or a combination of at least two of the above. The input unit 190 is coupled to the control unit 170, and receives commands and operating actions inputted by the user, which are provided for the control unit 170 to determine the meaning of the commands from the user. For example, the input unit 190 may be a touch panel, but the invention is not limited thereto.

In addition, if the display screen 110 adopts use of the single-piece display device in each of the foregoing embodiments, the single-piece display device may be a display device dedicated to and integrated with the near eye display system 100, or may be a display device of a portable electronic device, such as a smart phone (e.g., the smart phone may be detachably placed into the near eye display system 100 so the screen may serve as the display screen 110 described in the application). For the latter, the graphic processing unit 120, the control unit 170, the memory unit 180 may be disposed on the smart phone. After detecting that the longitudinal and/or lateral displacement amounts of the left-eye lens 132 and the right-eye lens 134 are adjusted by the focal length adjustment device 140 and/or the inter-pupillary distance adjustment device 150, the detection unit 160 can transmit the displacement amounts through a wireless communication (e.g., Bluetooth) transmitting device, or can adjust a control signal to be received by a wireless communication receiving device of the smart phone. Then, the control unit 170 and the graphic processing unit 120 can proceed to the adjustments for the positions and the sizes of the left-eye image LI and the right-eye image RI as described above.

In summary, the embodiments of the invention have at least one of the following advantages and effects. The near eye display systems and the operation methods thereof can be used to adjust the positions of the left-eye image and the right-eye image to be displayed on the display screen according to the lateral displacement amounts of the left-eye lens and the right-eye lens such that the center of the left-eye image is aligned with the center of the left-eye lens and the center of the right-eye image is aligned with the center of the right-eye lens. In addition, the near eye display system and the operation methods thereof can also be used to correspondingly adjust the sizes (magnification) of the left-eye image and the right-eye image to be displayed on the display screen based on longitudinal displacement amounts of the left-eye lens and the right-eye lens such that sizes of the visual left-eye image and the visual right-eye image seen by the user are identical. As a result, the near eye display systems can provide the favorable viewing quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A near eye display system, comprising:
   display screen, displaying a left-eye image and a right-eye image;
   a graphic processing unit, coupled to the display screen, configured to control positions of the left-eye image and the right-eye image on the display screen;
   a lens group, comprising a left-eye lens and a right-eye lens, the left-eye lens being disposed on an optical transmission path of the left-eye image, the right-eye lens being disposed on an optical transmission path of the right-eye image;
   an interpupillary distance adjustment device, comprising a first mechanical structure physically coupled to at least one of the left-eye lens and the right-eye lens to adjust a lateral distance in a lateral direction between the left-eye lens and the right-eye lens;
   a focal length adjustment device, comprising a second mechanical structure physically coupled to the left-eye lens and the right-eye lens to adjust a longitudinal distance between the left-eye lens and a left-eye of a user and a longitudinal distance between the right-eye lens and a right-eye of the user;
   a detection unit, configured to detect a value of the lateral distance between the left-eye lens and the right-eye lens before and after the adjustment by the interpupillary distance adjustment device as a result of adjustment of the lateral distance between the left-eye lens and the right-eye lens by the interpupillary distance adjustment device; and
   a control unit, coupled to the graphic processing unit, the interpupillary distance adjustment device and the detection unit, wherein the control unit execute an operation of:
   adjusting the portions of the left-eye image and the right-eye image displayed on the display screen in a direction parallel to the lateral direction between the left-eye lens and the right-eye lens based on the result of adjustment of the lateral distance between the left-eye lens and the right-eye lens such that a center of the left-eye image displayed on the display screen is aligned with a center of the left-eye lens and a center of the right-eye image displayed on the display screen is aligned with a center of the right-eye lens.

2. The near eye display system according to claim 1, wherein the display screen is a single-piece display device, and the left-eye image and the right-eye image are respectively displayed on a left-half and a right-half of the single-piece display device.

3. The near eye display system according to claim 1, wherein the display screen is a double-piece display device, and the double-piece display device comprises a left-eye display device and a right-eye display device, wherein the left-eye display device displays the left-eye image, and the right-eye display device displays the right-eye image.

4. The near eye display system according to claim 1, wherein a position of the display screen does not change together with the left-eye lens and the right-eye lens when the interpupillary distance adjustment device controls the lateral distance between the left-eye lens and the right-eye lens.

5. The near eye display system according to claim 1, wherein the detection unit further detects an interpupillary distance of a user and accordingly drives the interpupillary distance adjustment device to control lateral displacement amounts of the left-eye lens and the right-eye lens.

6. A near eye display system, comprising:
   display screen, displaying a left-eye image and a right-eye image;
   a graphic processing unit, coupled to the display screen, configured to control positions of the left-eye image and the right-eye image on the display screen;
   a lens group, comprising a left-eye lens and a right-eye lens, the left-eye lens being disposed on an optical transmission path of the left-eye image, the right-eye lens being disposed on an optical transmission path of the right-eye image;
   an interpupillary distance adjustment device, comprising a first mechanical structure physically coupled to at least one of the left-eye lens and the right-eye lens to adjust a lateral distance in a lateral direction between the left-eye lens and the right-eye lens;
   a focal length adjustment device, comprising a second mechanical structure physically coupled to the left-eye lens and the right-eye lens to adjust a longitudinal distance between the left-eye lens and a left-eye of a user and a longitudinal distance between the right-eye lens and a right-eye of the user;
   a detection unit, configured to detect values of the actual distances of the left-eye lens and the right-eye lens moved in the lateral direction as detected by the detection unit as a result of adjustment of the lateral distance between the left-eye lens and the right-eye lens by the interpupillary distance adjustment device; and
   a control unit, coupled to the graphic processing unit, the interpupillary distance adjustment device and the detection unit, wherein the control unit execute an operation of:
   adjusting the portions of the left-eye image and the right-eye image displayed on the display screen in a direction parallel to the lateral direction between the left-eye lens and the right-eye lens based on the result of adjustment of the lateral distance between the left-eye lens and the right-eye lens such that a center of the left-eye image displayed on the display screen is aligned with a center of the left-eye lens and a center of the right-eye image displayed on the display screen is aligned with a center of the right-eye lens.

7. The near eye display system according to claim 6, wherein the display screen is a single-piece display device, and the left-eye image and the right-eye image are respectively displayed on a left-half and a right-half of the single-piece display device.

8. The near eye display system according to claim 6, wherein the display screen is a double-piece display device, and the double-piece display device comprises a left-eye display device and a right-eye display device, wherein the left-eye display device displays the left-eye image, and the right-eye display device displays the right-eye image.

9. The near eye display system according to claim 6, wherein a position of the display screen does not change together with the left-eye lens and the right-eye lens when the interpupillary distance adjustment device controls the lateral distance between the left-eye lens and the right-eye lens.

10. The near eye display system according to claim 6, wherein the detection unit further detects an interpupillary distance of a user and accordingly drives the interpupillary distance adjustment device to control lateral displacement amounts of the left-eye lens and the right-eye lens.

11. An operation method for a near eye display system, the near eye display system comprising a display screen, a graphic processing unit, a lens group, an interpupillary distance adjustment device, a focal length adjustment device, a detection unit, and a control unit, wherein the lens group comprises a left-eye lens and a right-eye lens, the interpupillary distance adjustment device comprises a first mechanical structure physically coupled to at least one of the left-eye lens and the right-eye lens, the focal length adjustment device comprises a second mechanical structure physically coupled to at least one of the left-eye lens and the right-eye lens, and the operation method comprises:
  detecting a value of a lateral distance between the left-eye lens and the right-eye lens before and after the adjustment by the interpupillary distance adjustment device as a result of adjustment of the lateral distance between the left-eye lens and the right-eye lens by the interpupillary distance adjustment device such that a center of the left-eye lens is aligned with a center of a left pupil of a user and a center of the left-eye lens is aligned with a right pupil of the user;
  adjusting positions of a left-eye image and a right-eye image on the display screen by the control unit in a direction parallel to a lateral direction between the left-eye lens and the right-eye lens based on the result of adjustment of the lateral distance between the left-eye lens and the right-eye lens;
  adjusting a longitudinal distance between the left-eye lens and the left-eye of a user and a longitudinal distance between the right-eye lens and the right-eye of the user by the focal length adjustment device;
  detecting an adjustment amount of the focal length adjustment device or detecting actual distances of the left-eye lens and the right-eye lens moved in a longitudinal direction;
  performing a calculation for visual magnifications of the left-eye image and the right-eye image by the control unit based on the adjustment amount of the focal length adjustment device detected by the detection unit or based on the actual distances of the left-eye lens and the right-eye lens moved in the longitudinal direction detected by the detection unit; and
  displaying a compensated left-eye image and a compensated right-eye image on the display screen by the graphic processing unit according to the compensation rates of the left-eye image and the right-eye image determined by the control unit, such that sizes of a left-side visual image and a right-side visual image seen by the user are identical,
  wherein a center of the left-eye image displayed on the display screen is aligned with the center of the left-eye lens, and a center of the right-eye image displayed on the display screen is aligned with the center of the right-eye lens.

12. The operation method according to claim 11, wherein a position of the display screen does not change together with the left-eye lens and the right-eye lens when the lateral distance between the left-eye lens and the right-eye lens is adjusted.

13. The operation method according to claim 11, further comprising:
  detecting the center of the left pupil and the center of the right pupil of the user by the detection unit; and
  determining lateral displacement amounts of the left-eye lens and the right-eye lens by the control unit according to the center of the left pupil and the center of the right pupil of the user detected by the detection unit and accordingly driving the interpupillary distance adjustment device to correspondingly adjust the lateral distance between the left-eye lens and the right-eye lens.

14. The operation method according to claim 11, wherein the display screen, the graphic processing unit and the control unit are included in a portable electronic device detachably installed in the near eye display system, wherein lateral displacement amounts are wirelessly transmitted to the control unit in the portable electronic device after the detection unit detects the lateral displacement amounts of the left-eye lens and the right-eye lens, so that the positions of the left-eye image and the right-eye image on the display screen are adjusted correspondingly.

15. An operation method for a near eye display system, the near eye display system comprising a display screen, a graphic processing unit, a lens group, an interpupillary distance adjustment device, a focal length adjustment device, a detection unit, and a control unit, wherein the lens group comprises a left-eye lens and a right-eye lens, the interpupillary distance adjustment device comprises a first mechanical structure physically coupled to at least one of the left-eye lens and the right-eye lens, the focal length adjustment device comprises a second mechanical structure physically coupled to at least one of the left-eye lens and the right-eye lens, and the operation method comprises:
  detecting values of the actual distances of the left-eye lens and the right-eye lens moved in a lateral direction as detected by the detection unit as a result of adjustment of a lateral distance between the left-eye lens and the right-eye lens by the interpupillary distance adjustment device such that a center of the left-eye lens is aligned with a center of a left pupil of a user and a center of the left-eye lens is aligned with a right pupil of the user;
  adjusting positions of a left-eye image and a right-eye image on the display screen by the control unit in a direction parallel to the lateral direction between the left-eye lens and the right-eye lens based on the result of adjustment of the lateral distance between the left-eye lens and the right-eye lens;
  adjusting a longitudinal distance between the left-eye lens and the left-eye of a user and a longitudinal distance between the right-eye lens and the right-eye of the user by the focal length adjustment device;
  detecting an adjustment amount of the focal length adjustment device or detecting actual distances of the left-eye lens and the right-eye lens moved in a longitudinal direction;
  performing a calculation for visual magnifications of the left-eye image and the right-eye image by the control unit based on the adjustment amount of the focal length adjustment device detected by the detection unit or based on the actual distances of the left-eye lens and the right-eye lens moved in the longitudinal direction detected by the detection unit; and
  displaying a compensated left-eye image and a compensated right-eye image on the display screen by the graphic processing unit according to the compensation rates of the left-eye image and the right-eye image determined by the control unit, such that sizes of a left-side visual image and a right-side visual image seen by the user are identical, wherein a center of the left-eye image displayed on the display screen is aligned with the center of the left-eye lens, and a center of the right-eye image displayed on the display screen is aligned with the center of the right-eye lens.

16. The operation method according to claim 15, wherein a position of the display screen does not change together with the left-eye lens and the right-eye lens when the lateral distance between the left-eye lens and the right-eye lens is adjusted.

17. The operation method according to claim 15, further comprising:
   detecting the center of the left pupil and the center of the right pupil of the user by the detection unit; and
   determining lateral displacement amounts of the left-eye lens and the right-eye lens by the control unit according to the center of the left pupil and the center of the right pupil of the user detected by the detection unit and accordingly driving the interpupillary distance adjustment device to correspondingly adjust the lateral distance between the left-eye lens and the right-eye lens.

18. The operation method according to claim 15, wherein the display screen, the graphic processing unit and the control unit are included in a portable electronic device detachably installed in the near eye display system, wherein lateral displacement amounts are wirelessly transmitted to the control unit in the portable electronic device after the detection unit detects the lateral displacement amounts of the left-eye lens and the right-eye lens, so that the positions of the left-eye image and the right-eye image on the display screen are adjusted correspondingly.

* * * * *